Nov. 24, 1953  S. DOMESHEK  2,660,087
MULTIPLEX PICTURE PROJECTION APPARATUS
Filed Dec. 16, 1949  2 Sheets-Sheet 1

INVENTOR.
SOL DOMESHEK
BY
ATTORNEY

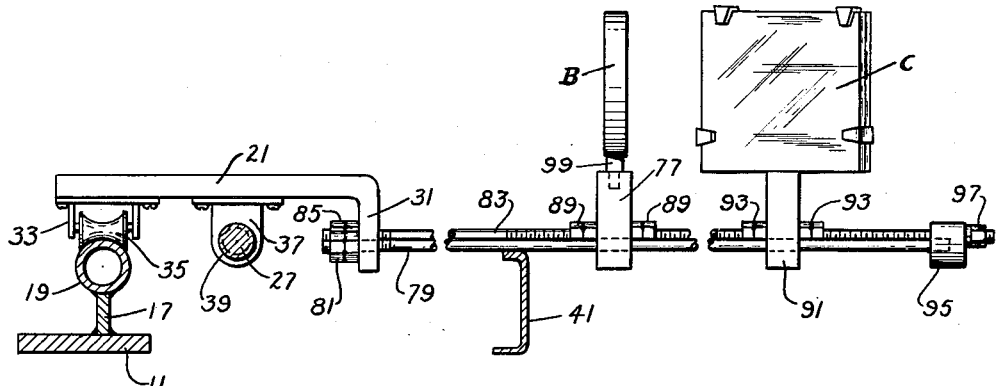
FIG. 5
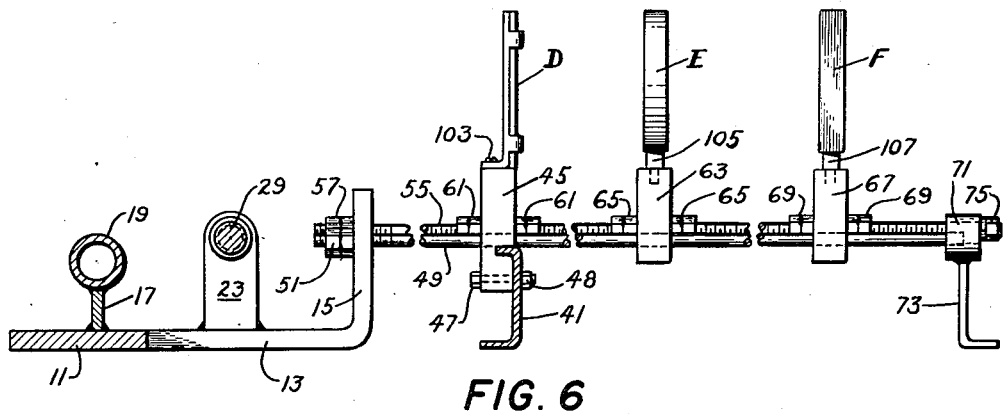
FIG. 6
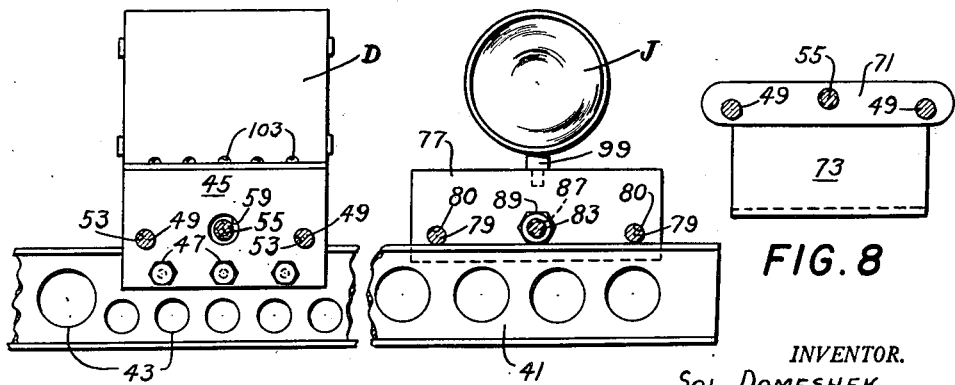
FIG. 7
FIG. 8
INVENTOR.
SOL DOMESHEK
BY
ATTORNEY Patented Nov. 24, 1953

2,660,087

UNITED STATES PATENT OFFICE 2,660,087

MULTIPLEX PICTURE PROJECTION APPARATUS

Sol Domeshek, Great Neck, N. Y.

Application December 16, 1949, Serial No. 133,454

11 Claims. (Cl. 88—16.6)

(Granted under Title 35, U. S. Code (1952), sec. 266)

This invention relates to improvements in picture projection devices, and more particularly pertains to improvements in multiplex picture projection apparatus.

The projection of two images along a common axis for superimposed display on a projection screen has numerous applications, such as the presentation of composite pictures, the provision of continuity of projection by alternate operation, thereby eliminating delay due to reloading, and the employment of visual comparison techniques in teaching.

A specific use for such devices is the teaching and demonstration of VPR (virtual plan position indicator reflectoscope) navigation techniques to groups of students. Such navigation involves the optical superposition of some form of chart upon a radar PPI (plan position indicator) and the maintenance of the two images in as near perfect registry as possible, thus allowing the center of the PPI representing the craft to determine its own position on the chart. Thus, for group demonstration, the two images must be projected upon a screen with their axes of projection coincident.

Such uni-axial duo-projection has been accomplished in the past by use of partial-silvered mirrors or prisms, but such systems have had serious disadvantages. First, dissipation of 60% or more of the initial light energy of the projectors, resulting in inordinately high operating temperatures, shorter operating life for the equipment, and discomfort to the operator, were characteristic. Second, magnification was limited by the low degree of brilliance of the images. Third, in systems using only approximate coaxial projection to achieve the applications noted above, oblique reflection introduces astigmatism. The structure herein disclosed and claimed overcomes these disadvantages.

The primary object of the invention is to provide uni-axial duo-projection apparatus adapted to make efficient use of the initial light energy of the projectors, thereby assuring lower operating temperatures and longer operating life, providing greater operator convenience, producing more brilliant images and thus permitting greater magnification, longer throw upon a screen and operation in rooms lit normally.

Another object is to provide uni-axial duo-projection apparatus employing a multi-prism mirror as the axis-combining element and positive spherical lenses and plane mirrors to direct the dual axes upon the combining element.

A further object is to provide uni-axial duo-projection apparatus incorporating a positive cylindrical lens to eliminate astigmatism due to oblique reflection.

Other objects and many of the attendant advantages of this invention will be readily appreciated as the same becomes better understood by reference to the following detailed description when considered in connection with the accompanying drawings wherein:

Fig. 5 is a section taken on the line 5—5 of Fig. 1;

Fig. 6 is a section taken on the line 6—6 of Fig. 1;

Fig. 7 is a section taken on the line 7—7 of Fig. 1; and

Fig. 8 is a section taken on the line 8—8 of Fig. 1.

Similar numerals refer to similar parts throughout the several views.

General arrangement

Figure 2:
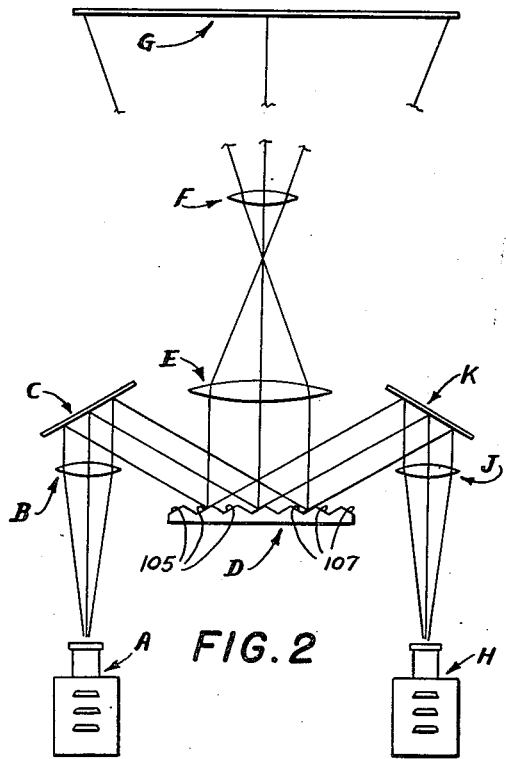
Fig. 2 is a diagrammatic view thereof.
Figure 3:
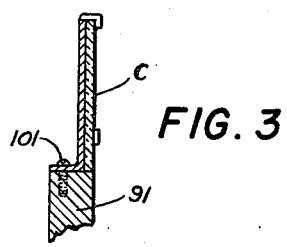
Fig. 3 is a section taken on the line 3—3 of Fig. 1.
Figure 4:
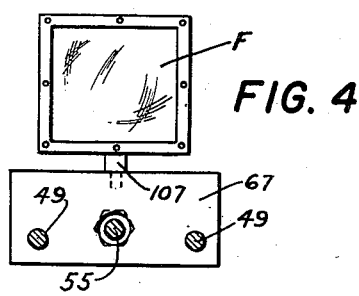
Fig. 4 is a section taken on the line 4—4 of Fig. 1.

As illustrated diagrammatically in Fig. 2, the divergent beam from the left projector A is converted into a parallel beam by the positive spherical lens B that is placed in its path. This parallel beam is then deflected to the right by a plane mirror C that is set at 60° to the axis of the beam toward a multi-prism mirror D. The base line of mirror D is normal to the original projection axis, and the vertical faces of said mirror D alternately lie parallel to the plane deflection mirror C and at a 60° angle to said mirror C.

This arrangement causes the parallel beam to strike only those faces of the multi-prism mirror D that are parallel to the plane mirror C and to be reflected totally along a path parallel to its original path. However, since the parallel beam has now suffered a horizontal astigmatism because it has undergone an oblique reflection, a positive spherical lens E is employed to reconvert the parallel beam to a convergent one, and a positive cylindrical lens F having a vertical axis is incorporated in the system to correct such horizontal astigmatism. Thus, an image originating at projector A as a circle will hit the screen G as a circle.

Similarly, the divergent beam from the right projector H is converted into a parallel beam by the positive spherical lens J that is placed in its path. This parallel beam is then deflected to the left by a plane mirror K that is set at 60° to the axis of the beam toward mirror D. The base line of said mirror D is normal to the original projection axis, thus causing the parallel beam to strike only those faces of said mirror D that are parallel to the plane mirror K and to be reflected totally along a path parallel to its original path. Correction for horizontal astigmatism is then effected in the manner described with reference to the beam from the left projector.

Coincident axes of projection and accurate registry of the two images on the screen is achieved by providing a frame support including means to adjust the distance between the projectors A and H and by providing distance control devices to vary the positions of lenses B and J, mirrors C and K, mirror D, and lenses E and F.

*Frame support and distance control mechanism*

Projector standard 11 is a beam having a medial arm portion 13 and an upstanding flange 15 located at the end of said arm portion. A plurality of posts 17 welded to said standard 11 carry a tube 19 that serves as a main guide rail and support for the projector platforms 21 and 22. A pair of posts 23 welded on said arm portion 13 carry rotatably a turnbuckle 25, said turnbuckle being disposed parallel to said tube 19. Oppositely threaded shafts 27 and 29 are secured in opposite ends of said turnbuckle, said shafts extending parallel to said tube 19.

Projector platforms 21 and 22 are plate members each adapted to serve as a base for a standard motion picture projector. Each of said platforms is provided with a depending flange portion 31. Brackets 33 secured to the nether face of each of said platforms mount rollers 35, which ride on tube 19. Brackets 37, also secured to the nether face of each of said platforms, are provided with threaded bores 39 that receive the threaded shafts 27 and 29. These elements are connected in such a manner that the platforms 21 and 22 are carried equidistant from an axis normal to tube 19, and are moved simultaneously and equidistantly towards or away from such axis by rotation of turnbuckle 25.

Channel beam 41, provided with lightening holes 43, is positioned parallel to tube 19. Multi-prism mirror mount 45 is a plate secured at the mid-point of said beam 41 by bolts 47 and nuts 48. Rods 49 have their threaded ends secured to flange 15 by nuts 51 and extend slidably through bores 53 in said mount 45. Threaded rod 55 has its end secured to flange 15 by nut 57 and extends slidably through bore 59 in said mount 45. Said rod 55 carries nuts 61 fore and aft said mount 45 to secure said mount and the channel beam 41 at a selected distance from tube 19.

Converging-beam-lens support 63 is a plate member carried slidably on rods 49 and 55, beyond mount 45, and nuts 65 carried on rod 55 fore and aft said support 63 are provided to secure support 63 at a selected distance beyond mount 45.

Cylindrical-lens support 67 is a plate member carried slidably on rods 49 and 55, beyond support 63, and nuts 69 carried on rod 55 fore and aft said support 67 are provided to secure support 67 at a selected distance beyond support 63.

Said rods 49 and 55 terminate beyond support 67 in bracket 71, which is carried on shoe 73. Rods 49 are secured in said bracket, and rod 55 extends therethrough, being secured by nut 75.

Parallel beam lens support 77 is a plate member carried slidably on rods 79, which extend through bores 80 in said support 77 and have their threaded ends secured to depending flange portion 31 by nuts 81. Said rods 79 bear on channel beam 41, and are slidable relative said beam, both fore and aft and along the length of said beam. Threaded rods 83 have their ends secured to said flange portion 31 by nuts 85 and extend slidably through bores 87 in said support 77. Said rods 83 carry nuts 89 fore and aft said support 77 to secure said supports at a selected distance from tube 19.

Plane mirror supports 91 are plate members carried slidably on rods 79 and 83, beyond support 77, and nuts 93 carried on rods 83 fore and aft said supports 91 are provided to secure supports 91 at a selected distance beyond support 77.

Rods 79 have their ends capped beyond supports 91 by brackets 95, and rods 83 pass through said brackets and are secured thereto by nuts 97.

From the foregoing description, it is apparent that shafts 27 and 29 and beam 41 are maintained parallel, and that rods 49, 55, 79 and 83 are maintained parallel and normal to shafts 27 and 29 and beam 41. It is further apparent that the projector platform 21 and its associated supports 77 and 91, and the projector platform 22 and its associated supports 77 and 91 can be moved towards or away from the axis defined by rod 55, each unit being maintained equidistant therefrom, and that mount 45 and supports 63, 67, 77 and 91 can each be adjusted fore and aft and secured in adjusted position.

*The optical system*

Figure 1:
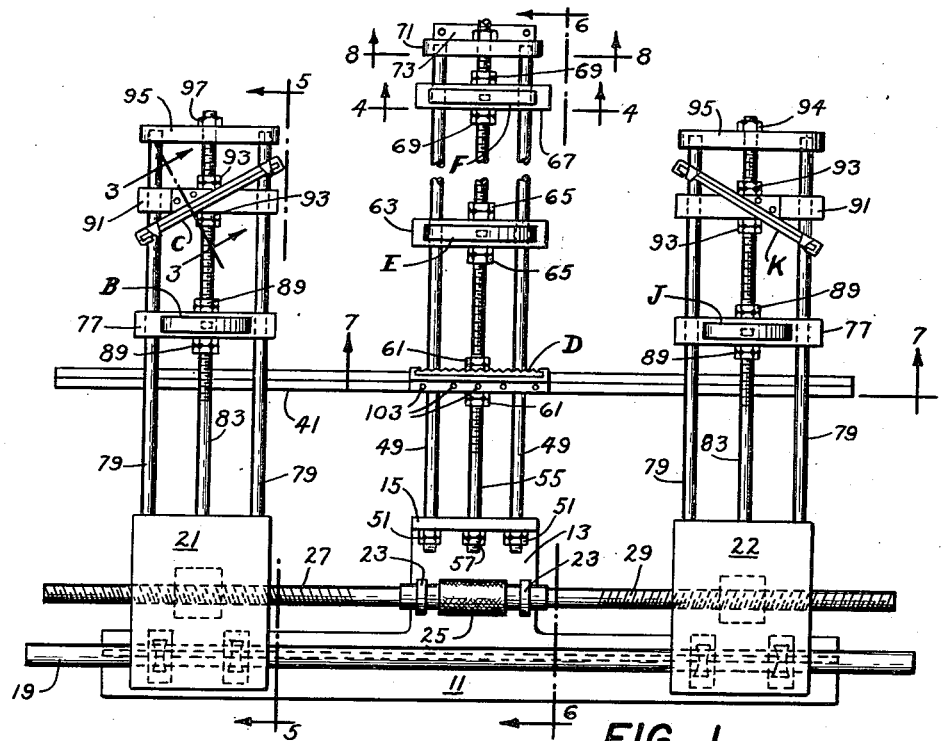
Fig. 1 is a plan view of uni-axial duo-projection apparatus, showing a preferred embodiment of the invention.

The principal planes of all lenses are parallel to each other and normal to the axes of projection, the plane mirrors of the system are oriented at 60° to the projection axes, and the faces of the multi-prism mirror are parallel alternately to each of the plane mirrors, as shown in Figs. 1 and 2.

Positive spherical lenses B and J are mounted on supports 77 by posts 99. Said lenses preferably are coated to minimize surface reflections and increase overall light transmission.

Plane mirrors C and K are mounted on supports 91, being secured thereon by screws 101. Said mirrors preferably are front surfaced and have a coating that will protect that surface from corrosion due to atmosphere and fingerprints, and will also afford protection from minor abrasion.

Multi-prism mirror D is mounted on the prismatic mirror mount 45, being secured thereon by screws 103. Vertical faces 105 of said mirror D are parallel to mirror C, and alternate vertical faces 107 of said mirror D are parallel to mirror K. Said mirror D preferably is front surfaced and provided with a protective coating similar to that of the plane mirrors C and K.

Positive spherical lens E is mounted on support 63 by post 105. Said lens E preferably is coated to increase light transmission.

The cylindrical surfaced positive lens F is mounted on support 67 by post 107, and preferably is also coated. Said lens F is of such focal length as to neutralize the horizontal astigmatism introduced by the multi-prism mirror.

Operation

In operation, projectors A and H are seated on projector platforms 21 and 22 respectively. The divergent beam from projector A is converted into a parallel beam by the positive spherical lens B, the parallel beam being obtained by fore or aft adjustment of support 17. This parallel beam is then deflected to the right by plane mirror C, which is set at 60° to the axis of the beam, toward multi-prism mirror D. Since the base line of mirror D is normal to the original projection axis and since the vertical faces 105 and 107 of mirror D are alternately parallel to the plane deflection mirror C and alternately at a 60° angle with mirror C, the beam is reflected by mirror C along a path parallel to its original path. The beam strikes only faces 105, which are parallel to the plane mirror, and are thus totally reflected along a path parallel to the original path of said beam.

The parallel beam having suffered a horizontal astigmatism because it has undergone an oblique reflection, it is then passed through positive spherical lens E, which reconverts the parallel beam to a convergent one, and then through a positive cylindrical lens with a vertical axis, lens F, so that horizontal astigmatism is corrected.

In similar fashion the divergent beam from projector H can be traced through the system—through lens J to mirror K, then to faces 107 of mirror D and then through lenses E and F. It is apparent that coincident axes of projection and accurate registry of the two images on the screen can be achieved merely by properly adjusting the perpendicular distance between the two projectors by means of turnbuckle 25 and visually observing the images merge into one on the screen.

In one particular application of the system, one of the projectors is equipped with X and Y motion cranks acting upon a member in the focal plane of the projection lens carrying the chartlet and the other projector shoots a picture of the radar PPI. With such a device, an entire class can observe and be instructed in the techniques of VPR navigation.

It is also to be noted that the light loss of the system is only that resulting from absorption in the various glass surfaces, and is of the order of 15%, whereas co-axial systems heretofore employed are characterized by light losses of the order of 60%.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. An optical system comprising a projector adapted to deliver a first beam of light rays, a second projector adapted to deliver a second beam of light rays parallel to said first beam, mirrors in the path of each of said beams faced to direct the beams reflected therefrom toward each other, and a multiprism mirror having alternate faces parallel respectively with said mirrors and in the path of the reflected beams.

2. An optical system comprising a projector adapted to deliver a first beam of light rays, a second projector adapted to deliver a second beam of light rays parallel to said first beam, mirrors in the path of each of said beams faced to direct the beams reflected therefrom toward each other, a multiprism mirror having alternate faces parallel respectively with said mirrors and in the path of the reflected beams, and means in the path of the last mentioned beams for correcting astigmatism.

3. An optical system comprising a projector adapted to deliver a first beam of light rays, a second projector adapted to deliver a second beam of light rays parallel to said first beam, mirrors in the path of each of said beams faced to direct the beams reflected therefrom toward each other, a multiprism mirror having alternate faces parallel respectively with said mirrors and in the path of the reflected beams, means in the path of the beams that have been reflected from the multiprism mirror to convert the parallel beams into convergent beams, and means in the path of the last mentioned beams for correcting astigmatism.

4. An optical system comprising a projector adapted to deliver a first beam of divergent light rays, means to convert said light rays to a first beam of parallel light rays, a second projector adapted to deliver a second beam of divergent light rays, means to convert said light rays to a second beam of parallel light rays parallel to said first beam, mirrors in the path of each of said beams faced to direct the beams reflected therefrom toward each other, and a multiprism mirror having alternate faces parallel respectively with said mirrors and in the path of the reflected beams.

5. An optical system comprising a projector adapted to deliver a first beam of divergent light rays, means to convert said light rays to a first beam of parallel light rays, a second projector adapted to deliver a second beam of divergent light rays, means to convert said light rays to a second beam of parallel light rays parallel to said first beam, mirrors in the path of each of said beams faced to direct the beams reflected therefrom toward each other, a multiprism mirror having alternate faces parallel respectively with said mirrors and in the path of the reflected beams, and means in the path of the last mentioned beams for correcting astigmatism.

6. An optical system comprising a projector adapted to deliver a first beam of divergent light rays, means to convert said light rays to a first beam of parallel light rays, a second projector adapted to deliver a second beam of divergent light rays, means to convert said light rays to a second beam of parallel light rays parallel to said first beam, mirrors in the path of each of said beams faced to direct the beams reflected therefrom toward each other, a multiprism mirror having alternate faces parallel respectively with said mirrors and in the path of the reflected beams, means in the path of the beams that have been reflected from the multiprism mirror to convert the parallel beams into convergent beams, and means in the path of the last mentioned beams for correcting astigmatism.

7. An optical system comprising a projector adapted to deliver a first beam of divergent light rays, means to convert said light rays to a first beam of parallel light rays, a second projector adapted to deliver a second beam of divergent light rays, means to convert said light rays to a second beam of parallel light rays parallel to said first beam, mirrors in the path of each of said beams and at an angle of 60° with their respective beams and faced to direct the reflected beams toward each other, a multiprism mirror having alternate faces parallel respectively with said mirrors, said multiprism mirror being in the path of said reflected beams, and means in the path of the beams reflected from said multiprism mirror to convert the parallel beams into divergent beams.

8. An optical system comprising a projector adapted to deliver a first beam of divergent light rays, means to convert said light rays to a first beam of parallel light rays, a second projector adapted to deliver a second beam of divergent light rays, means to convert said light rays to a second beam of parallel light rays parallel to said first beam, mirrors in the path of each of said beams and at an angle of 60° with their respective beams and faced to direct the reflected beams toward each other, a multiprism mirror having alternate faces parallel respectively with said mirrors, said multiprism mirror being in the path of said reflected beams, means in the path of the beams reflected from said multiprism mirror to convert the parallel beams into convergent beams, and means in the path of said convergent beams for correcting astigmatism.

9. An optical system comprising a projector adapted to deliver a first beam of divergent light rays, a second projector adapted to deliver a second beam of divergent light rays, spherical surface lenses in the path of each of said beams adapted to convert said beams into parallel beams of parallel light rays, mirrors in the path of each of said parallel beams faced to reflect said beams toward each other at an angle of 60° with said parallel beams, a multiprism mirror having alternate faces parallel respectively with said mirrors, said multiprism mirror being in the path of the reflected beams, a spherical lens in the path of the beams reflected from the multiprism mirror, said spherical lens being adapted to convert the parallel beams into convergent beams, and a cylindrical surface lens in the path of the last mentioned beams for correcting astigmatism.

10. An optical system comprising a first projector adapted to deliver a first beam of divergent light rays, a first lens adapted to convert said light rays to a beam of parallel light rays, a first mirror in said parallel beam at an angle of 60° thereto, a second projector adapted to deliver a second beam of divergent light rays, a second lens adapted to convert said light rays to a beam of parallel light rays, a second mirror in said parallel beam at an angle of 60° thereto, the beams reflected from said first and second mirrors being intersected by a multiprism mirror having alternate faces parallel respectively with said mirrors, means to move said first projector, first lens and first mirror laterally simultaneously, means to move said second projector, second lens and second mirror laterally simultaneously and oppositely equidistantly to the direction of movement of said first projector, first lens and first mirror, and means to move said multiprism mirror longitudinally.

11. In the optical system defined in claim 10, means to move said first and second lenses and said first and second mirrors longitudinally.

SOL DOMESHEK.

References Cited in the file of this patent

UNITED STATES PATENTS

| Number | Name | Date |
|---|---|---|
| 1,247,646 | Craig | Nov. 27, 1917 |
| 1,556,216 | Griffith | Oct. 6, 1925 |
| 1,585,129 | Smith | May 18, 1926 |
| 2,413,996 | Ramsdell | Jan. 7, 1947 |

FOREIGN PATENTS

| Number | Country | Date |
|---|---|---|
| 374,064 | Germany | Apr. 19, 1923 |